(12) United States Patent
Chi

(10) Patent No.: US 6,231,063 B1
(45) Date of Patent: May 15, 2001

(54) COMBINATION OF STEERING BEARING ASSEMBLY AND HEAD TUBE OF A BICYCLE

(76) Inventor: Yi-Chen Chi, No. 139-5, An-Mei Rd, Mei Shan Village, Hou Li Hsiang, Taichung Hsien (TW)

( * ) Notice: Subject to any disclaimer, the term of this patent is extended or adjusted under 35 U.S.C. 154(b) by 0 days.

(21) Appl. No.: 09/361,166

(22) Filed: Jul. 27, 1999

(51) Int. Cl.[7] ................................................. B62K 21/18
(52) U.S. Cl. ........................................... 280/279; 280/276
(58) Field of Search ................................... 280/279, 276, 280/274; 384/510, 513, 617, 537; 74/551.1

(56) References Cited

U.S. PATENT DOCUMENTS

| | | | |
|---|---|---|---|
| 722,171 | * | 3/1903 | Baden-Powell . |
| 4,573,698 | * | 3/1986 | Takahashi et al. ................... 280/279 |
| 4,874,073 | * | 10/1989 | Tagawa ................................. 192/98 |
| 5,211,489 | * | 5/1993 | Moore ................................... 384/585 |
| 5,330,220 | * | 7/1994 | Nagano ................................ 280/279 |
| 5,647,684 | * | 7/1997 | Chen ..................................... 403/370 |
| 5,893,574 | * | 4/1999 | Campagnolo ........................ 280/279 |
| 5,964,474 | * | 10/1999 | Chen ..................................... 280/279 |

FOREIGN PATENT DOCUMENTS 5-32188 * 2/1993 (JP) .

* cited by examiner

Primary Examiner—Brian L. Johnson
Assistant Examiner—Avraham H. Lerner
(74) Attorney, Agent, or Firm—Rosenberg, Klein & Lee

(57) ABSTRACT

A head tube of a bicycle includes two enlarged ends each having a first groove defined at the inside thereof, and a steering bearing assembly includes a first race which is engaged with the first groove manually. The first race has a second groove so as to receive a bearing therein which is positioned by a retaining member and a pressing member. Each enlarged end of the head tube has a straight tubular portion and a shoulder is connected between the inside defining the second groove and the inside of the straight tubular portion of the enlarged end. A gap is defined between the inside of the straight tubular portion and the first race so that the first race is manually to be engaged with the first groove of the enlarged end.

9 Claims, 5 Drawing Sheets

COMBINATION OF STEERING BEARING ASSEMBLY AND HEAD TUBE OF A BICYCLE

FIELD OF THE INVENTION

The present invention relates to a steering bearing assembly for a bicycle, and more particularly, to a steering bearing assembly having an annular race and the head tube having a groove defined in each end there so that the race can be easily engaged with the groove of the head tube manually.

BACKGROUND OF THE INVENTION

A conventional steering bearing assembly 600 is shown in FIG. 5 and includes a first race 60 having a neck portion 601 inserted into the head tube 20, a bearing 61 engaged with the groove defined in the first race 60 and a ring 62 retaining the bearing 61 in position. A second race, or engaging member, 63 is used to press the ring 62 in position. A steering tube 50 extends through the two sets of steering bearing assemblies 600 at two ends of the head tube 20, and a handlebar stem is fixedly connected to the steering tube 50 so that when turning the handlebar, the steering tube 50 rotates while the head 220 is not rotated. It is to be noted that the neck portion 601 of each steering bearing assembly 600 has to be force-fitted into the head 220 by a specific machine. In other words, consumers would find it difficult to press the neck portion 601 into the head tube with a simple tool.

The present invention intends to provide a combination of a steering bearing assembly and a head tube for a bicycle, wherein the head tube has an annular groove at two ends thereof, and the first race of the steering bearing assembly has an annular race which is easily received in the groove so that the pressing machine will not be necessary when installing the steering bearing assembly to the head tube. The present invention provides a steering bearing assembly which is able to be connected to the head tube manually.

SUMMARY OF THE INVENTION

In accordance with one aspect of the present invention, a punch is provided a combination of a steering bearing assembly and a head tube of a bicycle. The head tube has two enlarged ends and each enlarged end has a first groove defined in the inside thereof. The steering bearing assembly has a first race which is received in the first groove of the head tube and has a second groove defined in the inside thereof. A bearing is received in the second groove with a retaining member mounted to the bearing so that the bearing is retained between the first race and the retaining member. A pressing member is mounted to the retaining member.

The primary object of the present invention is to provide a combination of a steering bearing assembly and a head tube of a bicycle wherein the steering bearing assembly is easily put in the groove defined in each enlarged end of the head tube.

Further objects, advantages, and features of the present invention will become apparent from the following detailed description with appropriate reference to the accompanying drawings.

DETAILED DESCRIPTION OF THE PREFERRED EMBODIMENT

Figure 1:
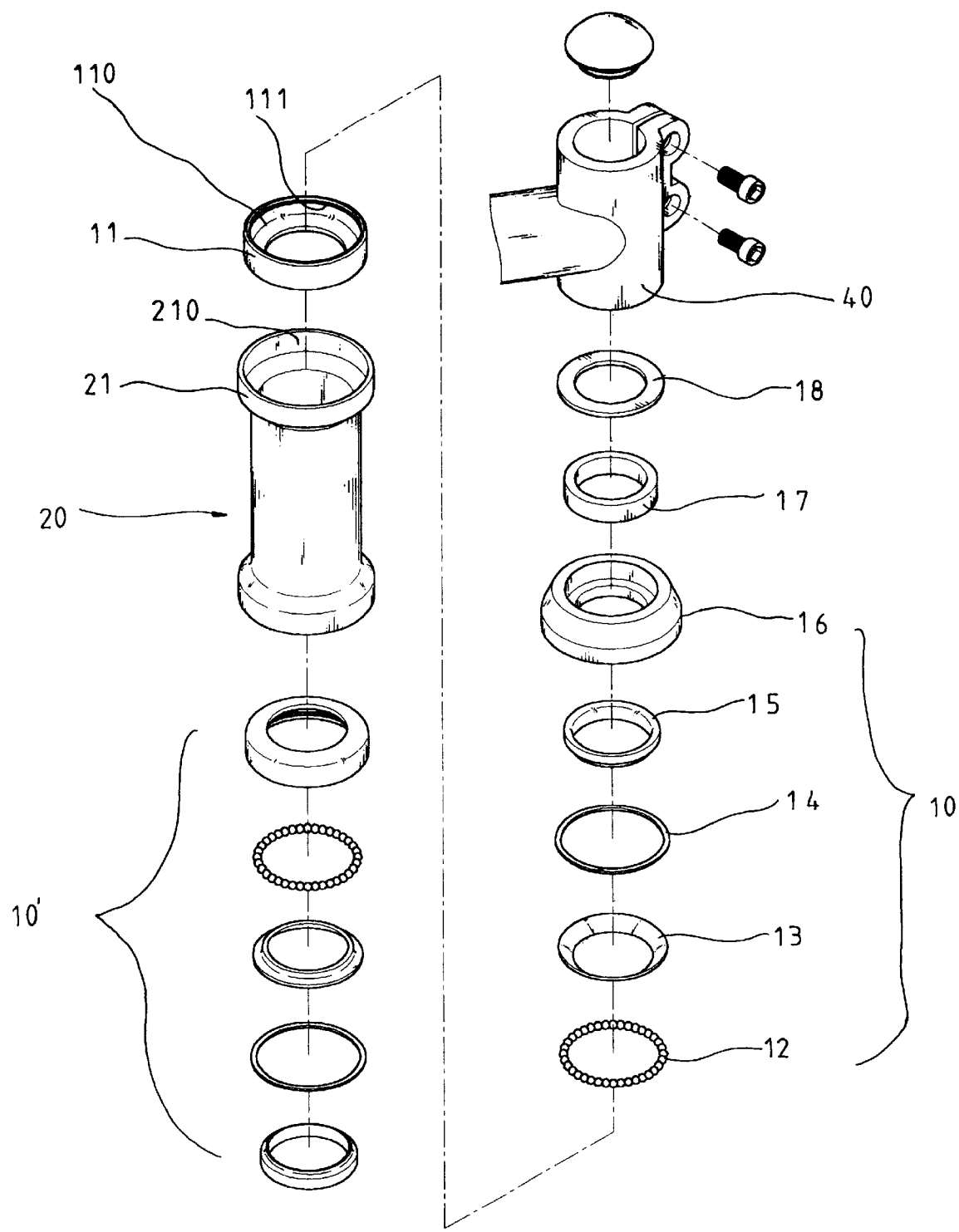
FIG. 1 is an exploded view to show the combination of the head tube and the steering bearing assembly in accordance with the present invention.
Figure 2:
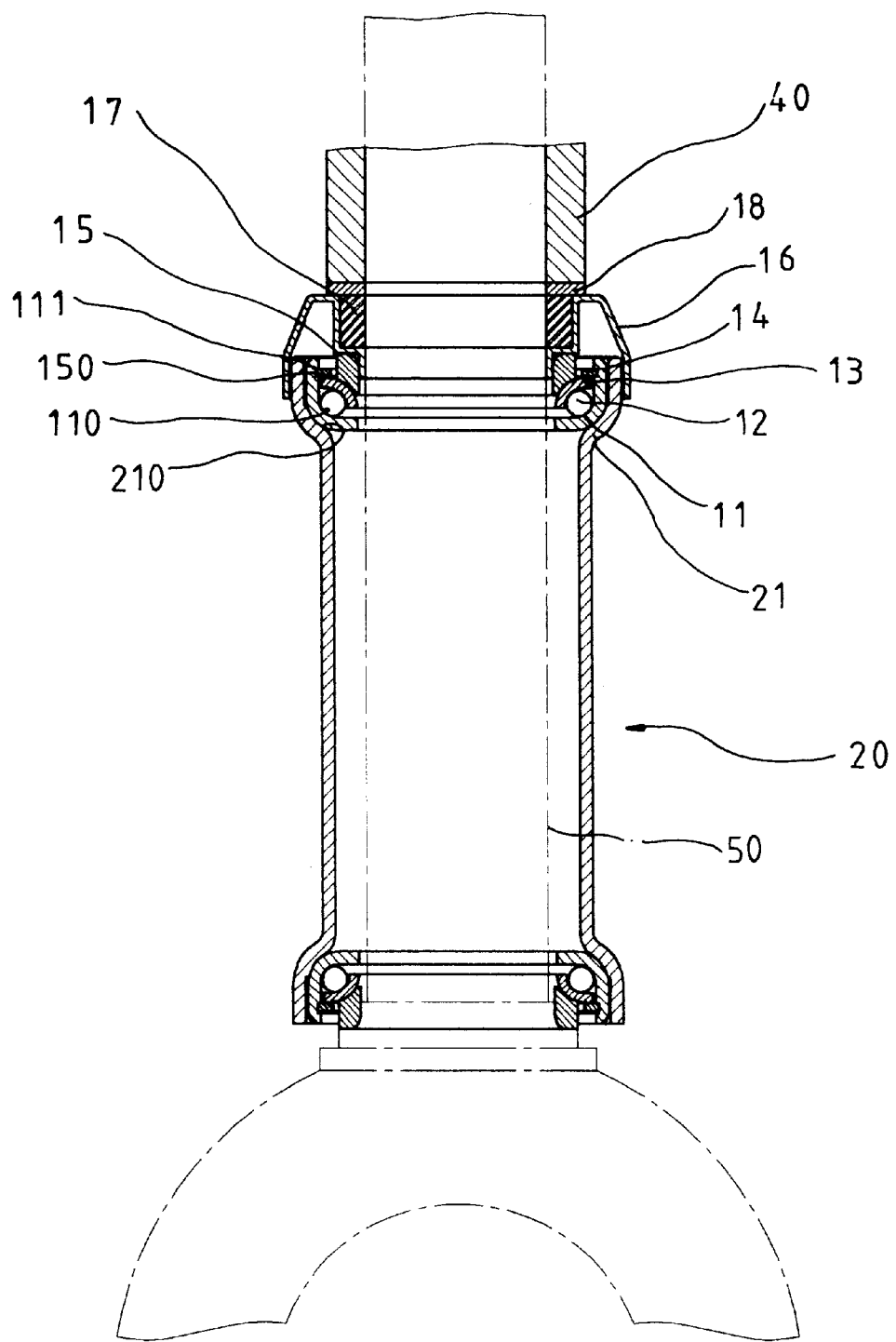
FIG. 2 is a side elevational view, partly in section, of the combination in accordance with the present invention.
Figure 3:
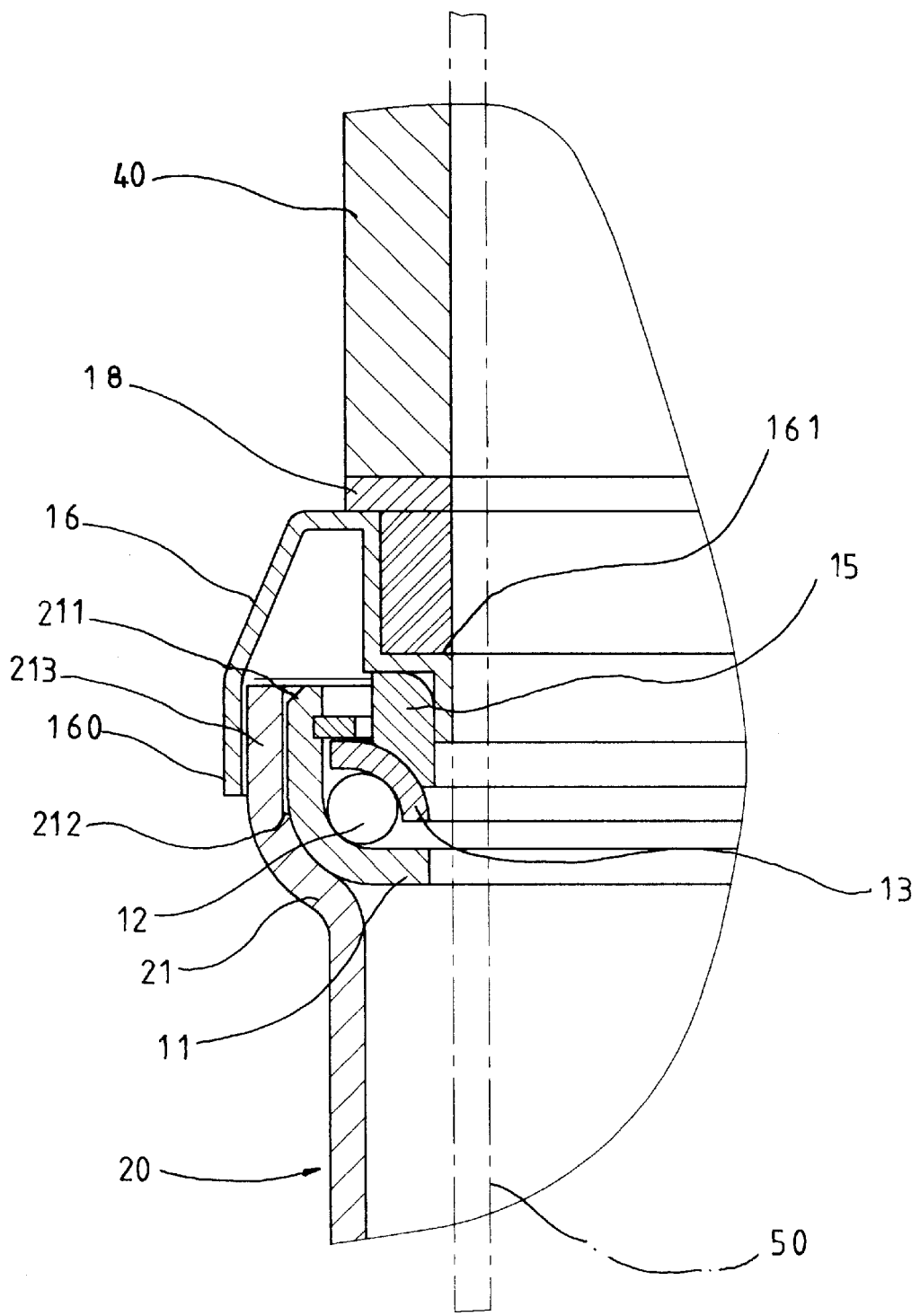
FIG. 3 is an enlarged cross-sectional view to show the upper steering bearing assembly of the combination in accordance with the present invention.

The combination of a steering bearing assembly and a head tube of a bicycle in accordance with the present invention is shown in FIGS. 1 to 3, wherein the head tube 20 has two enlarged ends 21 and each enlarged end 21 has a first groove 210 defined in the inside thereof. Each enlarged end 21 has a straight tubular portion 213 and a shoulder 212 extending from the inside of the straight tubular portion 213. The shoulder 212 is connected between the inside of the straight tubular portion 213 and the inside defining the first groove 210.

Each of the two enlarged ends 21 is engaged with a steering bearing assembly 10/10'. The two steering bearing assemblies 10, 10' are basically identical and each have a first race 11 which is an annular curved ring-shaped member and received in the first groove 210 of the head tube 20. It is to be noted that there will be a gap 211 defined between the inside of the straight tubular portion 213 of the enlarged end 21 and the first race 11 because of the shoulder 212. In other words, because of the shoulder 212, the inner diameter of the enlarged end 21 is larger than the outer diameter of the first race 11 so that the first race 11 can be easily put in the first groove 210. The first race 11 has a second groove 110 defined in the inside thereof and a bearing 12 is received in the second groove 110. A retaining member 13 is mounted to the bearing 12 so that the bearing 12 is retained between the first race 21 and the retaining member 13. A pressing member 15 is mounted to the retaining member 13 and a pressing ring 14 engaged with an engaging groove 111 defined in the inside of the first race 11 extends radially inward from the inside of the first race 11 so as to press on the retaining member 13.

A second race, or engaging member, 16 is connected to the pressing member 15 and has an annular skirt portion 160 which encloses the enlarged end 21 of the head tube 20. annular recess 161 defined in the inside thereof and a shock absorbing member 17 is engaged with the annular recess 161 and contacts the steering tube 50 passing through the steering bearing assembly. A washer 18 and a handlebar stem 40 are respectively mounted to the steering tube 50 and press the whole steering bearing assembly 10 in position.

Figure 4:
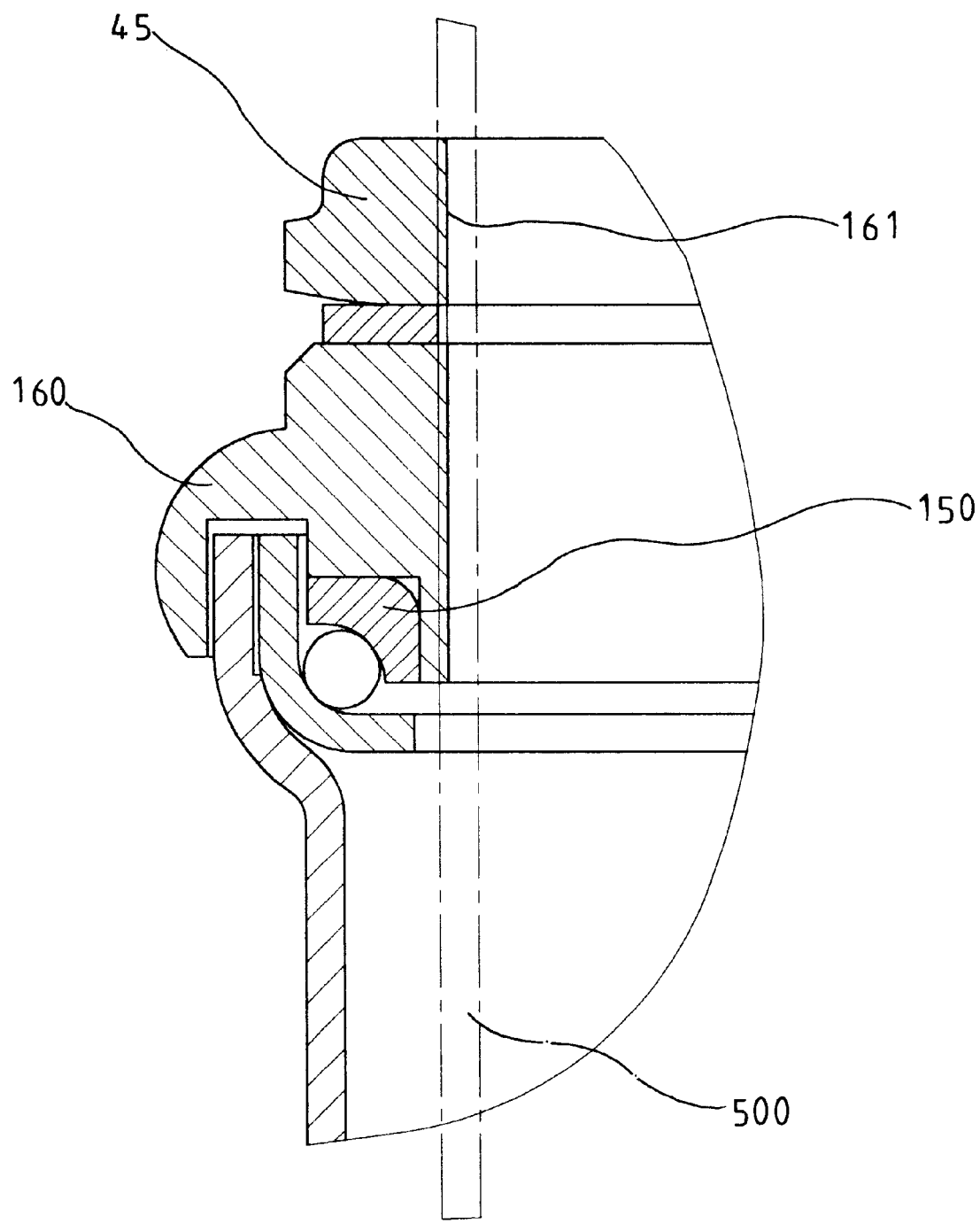
FIG. 4 is an enlarged cross-sectional view to show another embodiment of the steering bearing assembly of the combination in accordance with the present invention.
Figure 5:
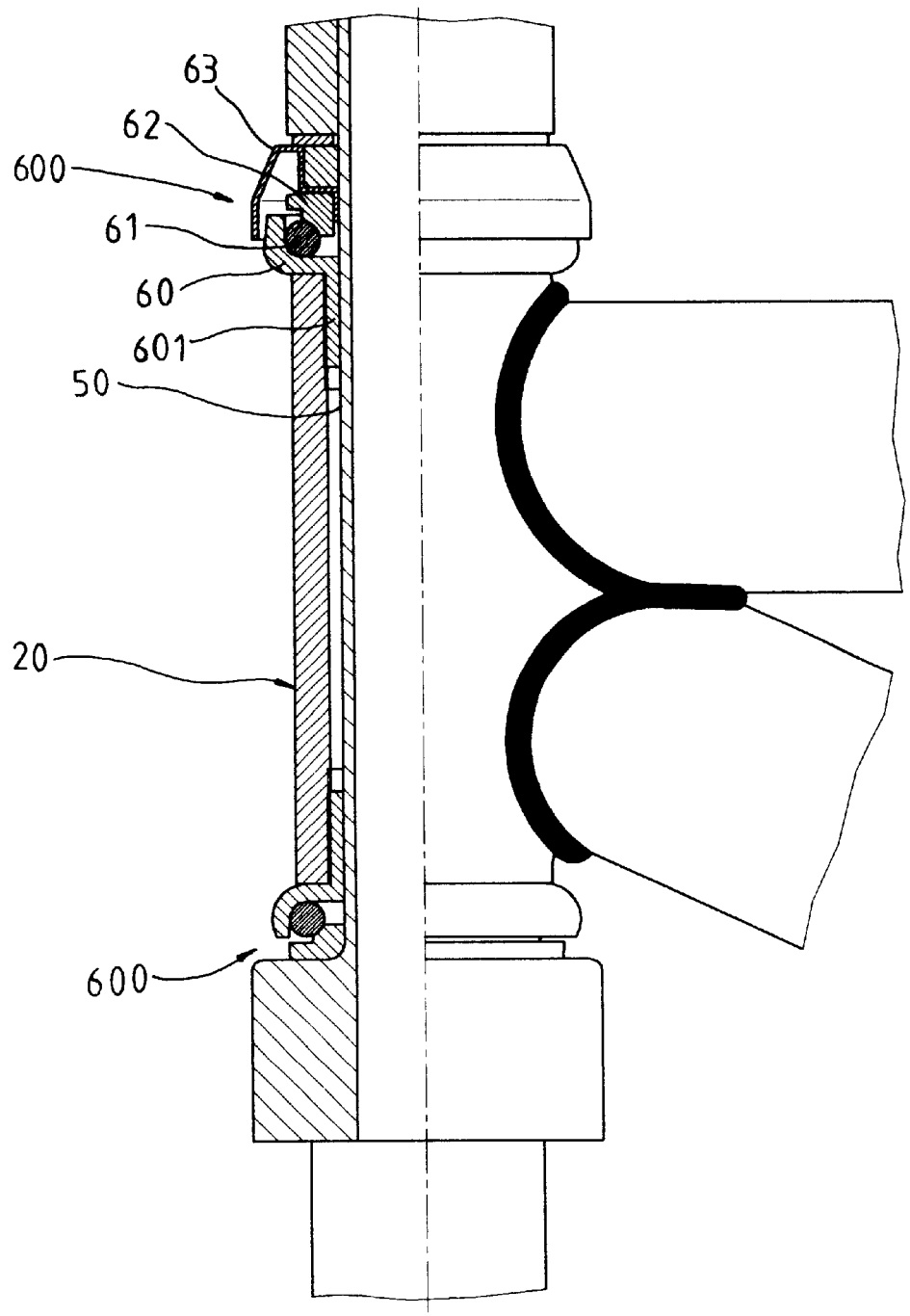
FIG. 5 is a cross-sectional view to show a combination of two conventional steering bearing assemblies and the conventional head tube.

Referring to FIG. 4, the retaining member 13 and the pressing member 15 as shown in FIG. 3 can also be made in a simple way to be a one-piece member 150 and the second race 160 can be a solid member. The second race 160 has threaded inside 161 so as to securely engaged with a threaded steering tube 500 together with a locking nut 45.

Accordingly, the users can easily install the steering bearing assemblies to the head tube without using any machine and the combination is suitable to be mounted to threaded steering tube or non-threaded steering tube.

The invention is not limited to the above embodiment but various modification thereof may be made. It will be understood by those skilled in the art that various changes in form and detail may made without departing from the scope and spirit of the present invention.

What is claimed is:

1. A combination of a steering bearing assembly and a head tube of a bicycle, said head tube having two enlarged ends and each enlarged end having a first groove defined in the inside thereof;

said steering bearing assembly having a first race which is received in said first groove of said head tube, said first race having a second groove defined in the inside thereof and a bearing received in said second groove, a retaining member mounted to said bearing so that said bearing is retained between said first race and said retaining member; and, a pressing member mounted to said retaining member;

wherein each enlarged end has a straight tubular portion, a shoulder connected between an inside of said straight tubular portion and an inside defining said first groove so as to define a gap between said first race and said straight tubular portion.

2. A combination of a steering bearing assembly and a head tube of a bicycle, said head tube having two enlarged ends and each enlarged end having a first groove defined in the inside thereof;

said steering bearing assembly having a first race which is received in said first groove of said head tube, said first race having a second groove defined in the inside thereof and a bearing received in said second groove, a retaining member mounted to said bearing so that said bearing is retained between said first race and said retaining member;

a pressing member mounted to said retaining member;

an engaging member coupled to said pressing member, wherein said engaging member has an annular recess defined in the inside thereof, and a shock absorbing member is engaged with said annular recess.

3. A steering apparatus comprising:

(a) a head tube extending axially between a pair of enlarged ends, each of said enlarged ends describing a first annular groove;

(b) at least one steering bearing assembly coupled to one of said head tube enlarged ends, said steering bearing assembly including:

(1) a first race received in said head tube enlarged end to substantially overlay said first annular groove, said first race describing a second annular groove, respective portions of said first race and said enlarged end defining therebetween an annular gap;

(2) at least one bearing received in said second annular groove; and, (3) a retaining member capturing said bearing against said second annular groove; and, (c) a pressing member coupled to said retaining member.

4. The steering apparatus as recited in claim 3 further comprising a pressing ring coaxially coupled to said first race to extend radially inward from a portion thereof, said pressing ring retentively engaging at least a portion of said retaining member.

5. The steering apparatus as recited in claim 3 wherein each said head tube enlarged end includes a shoulder portion formed about said first groove and a straight tubular portion extending from said shoulder portion to bound said annular gap.

6. The steering apparatus as recited in claim 3 further comprising an engaging member coupled to said pressing member.

7. The steering apparatus as recited in claim 3 wherein said engaging member includes an annular skirt portion radially enveloping said head tube enlarged end.

8. The steering apparatus as recited in claim 3 further comprising a shock absorbing member received within an inner annular recess formed in said engaging member.

9. The steering apparatus as recited in claim 3 wherein said retaining and pressing members are integrally joined.

* * * * *